J. B. BUSHNELL.
MAGNETO.
APPLICATION FILED DEC. 14, 1917.

1,290,710.

Patented Jan. 7, 1919.
3 SHEETS—SHEET 1.

INVENTOR.
John B. Bushnell
BY
ATTORNEY.

J. B. BUSHNELL.
MAGNETO.
APPLICATION FILED DEC. 14, 1917.

1,290,710.

Patented Jan. 7, 1919.
3 SHEETS—SHEET 2.

INVENTOR.
John B. Bushnell
BY
S. Webster
ATTORNEY.

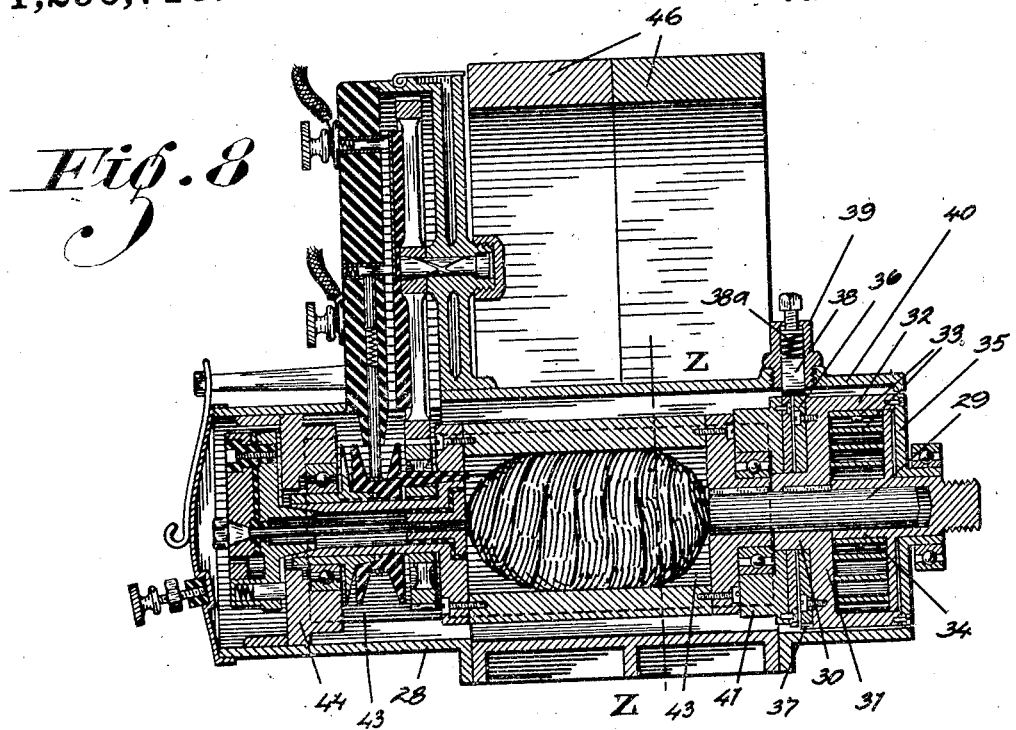
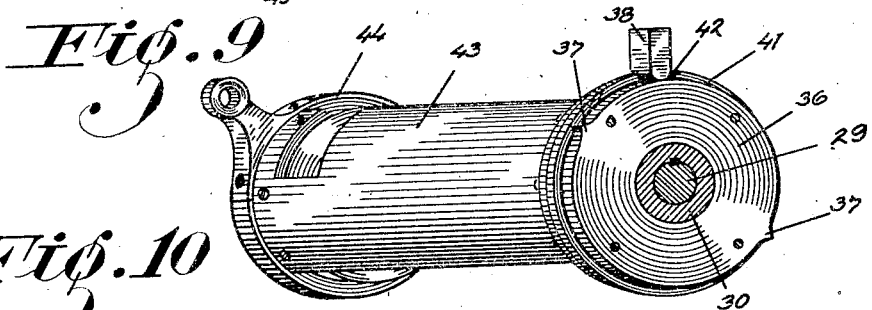
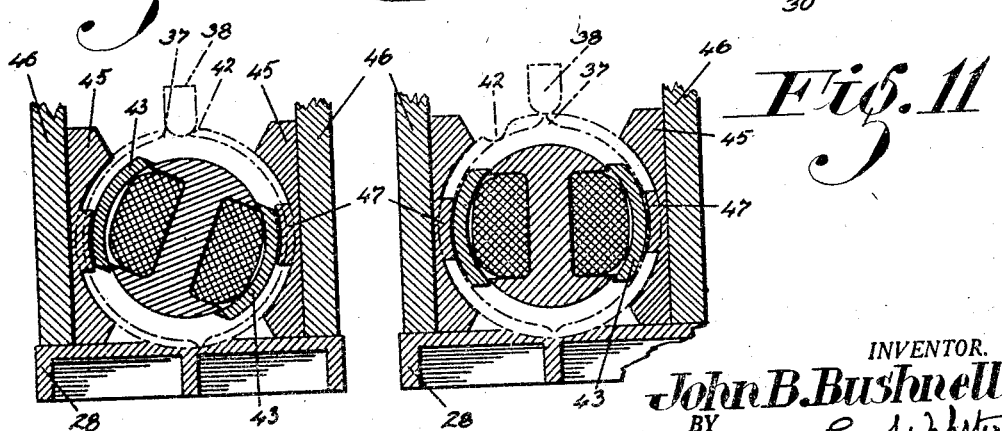

UNITED STATES PATENT OFFICE.

JOHN B. BUSHNELL, OF VACAVILLE, CALIFORNIA, ASSIGNOR, BY DIRECT AND MESNE ASSIGNMENTS, TO BUSHNELL MAGNETO COMPANY, OF SAN FRANCISCO, CALIFORNIA, A CORPORATION.

MAGNETO.

1,290,710.  Specification of Letters Patent.  Patented Jan. 7, 1919.

Application filed December 14, 1917. Serial No. 207,069.

*To all whom it may concern:*

Be it known that I, JOHN B. BUSHNELL, a citizen of the United States, residing at Vacaville, in the county of Solano and State of California, have invented certain new and useful Improvements in Magnetos; and I do declare the following to be a clear, full, and exact description of the same, reference being had to the accompanying drawings, and to the characters of reference marked thereon, which form a part of this application.

This invention relates to improvements in electric generators, particularly that type commonly known as the magneto, wherein electromotive force is generated by the revolution of an armature within a magnetic field consisting of charged magnets mounted on which are pole shoes between which the armature revolves.

The object of the invention is to produce a high tension magneto in which the intensity of the electromotive force generated by the same will be generally constant, irrespective of the speed at which the engine or motor, in connection with which the magneto may be operated, is driven. To this end, I aim to produce a magnet which will generate the electromotive force of the same intensity even when fully retarded. I also aim to so construct the magneto that when the engine to which it is connected is being started and consequently turned at a slow speed, the magneto armature, itself, may be driven at a relatively fast speed so as to give a hot, quick and intense spark, whereby the engine may be started more readily than where such armature is driven at the same relative speed.

The use of my improved magneto will be especially advantageous in connection with high speed motors or engines such as are used in aeroplanes, speed boats or the like. The engines are usually large, heavy duty, high speed engines and with the ordinary type of magneto it is very hard to start them due to the fact that the spark from a magneto driven at the same relative speed when starting is of an insufficient intensity to quickly explode the fuel mixture. This objection I aim to overcome by my improved invention.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Fig. 8 is a vertical longitudinal section of a magneto showing a modified type of my invention from that shown in Fig. 1.

Fig. 9 is a perspective view showing the type of secondary pole shoe and accelerator control used in connection with the subject matter shown in Fig. 8.

Fig. 10 is a sectional view taken on a line Z—Z of Fig. 8 showing the armature and secondary pole shoes in the position they assume when the magneto is set at full retarded position.

Fig. 11 is a sectional view of the same showing the parts in the position which they assume when the magneto is set at full advanced position.

Figure 1:
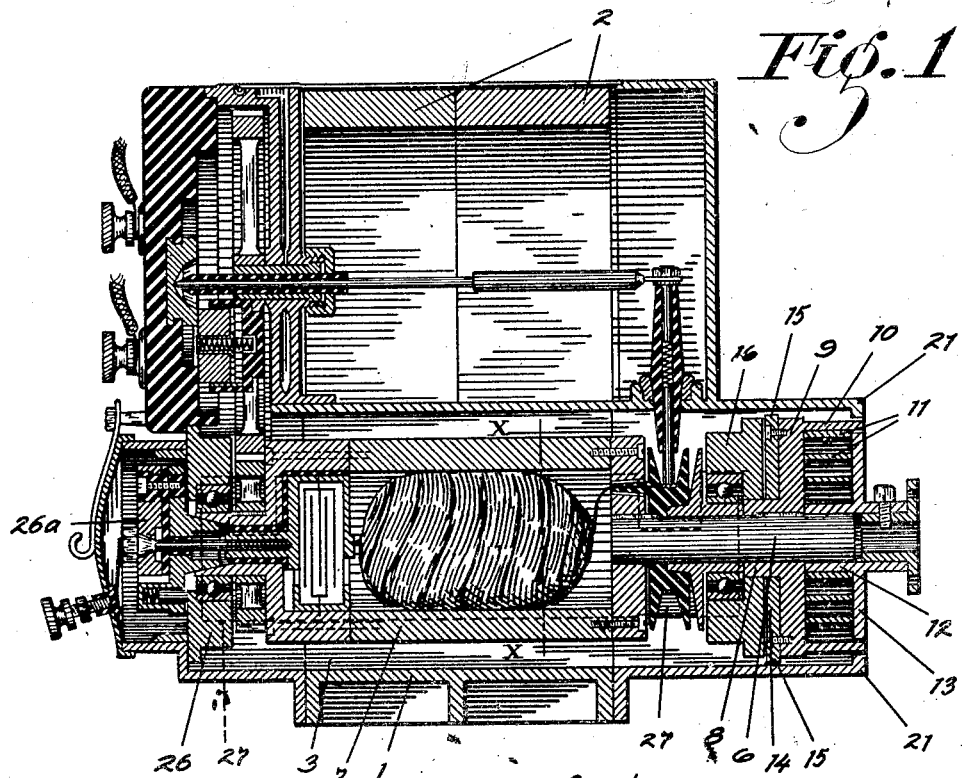
Figure 1 is a vertical longitudinal section of the preferred type of magneto covering my improved invention.
Figure 2:
Fig. 2 is a perspective view of the magnets showing the pole shoes in connection therewith.
Figure 3:
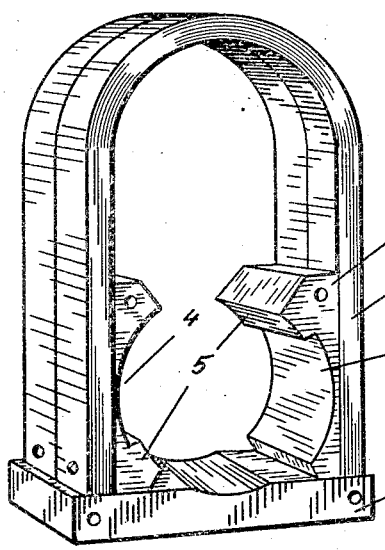
Fig. 3 is a perspective view of the secondary pole shoes used in connection with my improved invention.
Figure 3:
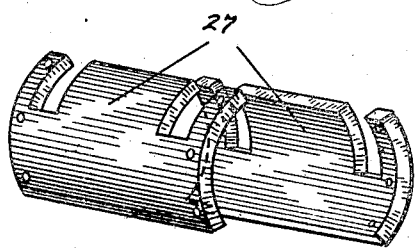

Referring now more particularly to the characters of reference on the drawings, the numeral 1 designates the base on which are mounted the usual magnets 2. Within the magnets 2 are arranged the primary pole shoes 3. In my improved construction, a portion of each pole shoe is cut away, as at 4, leaving a projecting shoulder 5 on each pole shoe. That shoulder on one shoe is at the opposite end to that on the other shoe, all for a purpose as will presently appear.

The numeral 6 designates the driven shaft of the armature core 7. I connect this driven shaft 6 with the driving shaft driven by the motor or engine, not in the usual manner now commonly employed, but by means of an intermediate connection arranged and designed to enable me to accelerate the speed of the armature shaft 6 relative to the driving shaft when the engine is first started, and this mechanism is constructed substantially as follows:—

Keyed to the shaft 6 is a sleeve 8 carrying a disk 9 having a projecting annular ring 10 on its face. A coiled spring 11 is connected at one end to the ring 10 and at the opposite end to a sleeve 12 turnably mounted on the end of the shaft 6.

Figure 5:
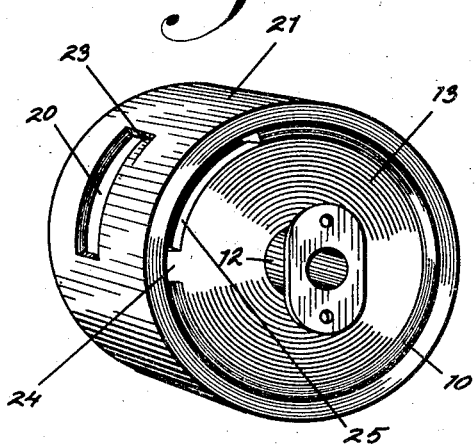
Fig. 5 is a perspective view of my armature speed accelerating mechanism with the control arm not shown.
Figure 6:
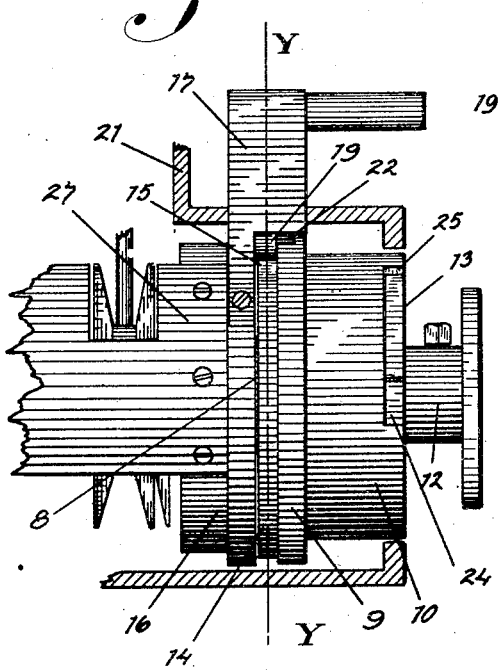
Fig. 6 is a side elevation of the same subject matter showing the control arm connected therewith.
Figure 7:
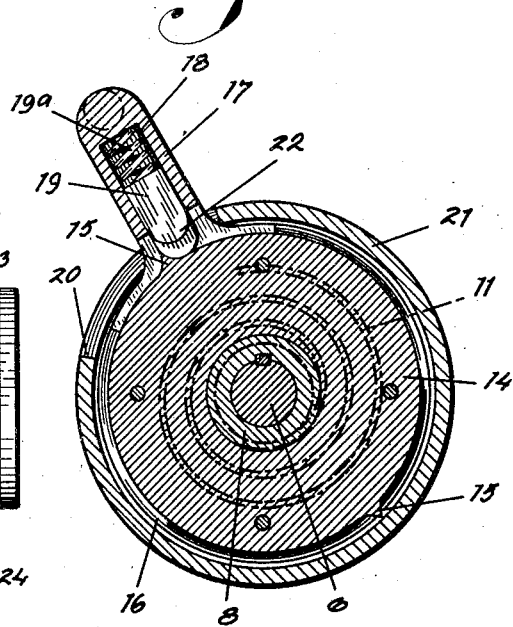
Fig. 7 is a sectional view taken on a line Y—Y of Fig. 6.

The sleeve 12 has a projecting disk 13 inclosing the end of the ring 10 to efficiently house the spring 11. A disk 14 is fixed to the rear of the disk 9 and is provided with a pair of equally projecting cams 15 for a purpose as will presently appear. Turnably mounted on the sleeve 8 is one of the timing rings 16 connected with which is the timing arm 17, (see Fig. 7). The timing arm 17 is provided with a central orifice 18 in which is slidable a spring pressed dog 19 acting under the pressure of a coiled spring 19ª. The arm 17 projects through a slot 20 in the housing 21 which covers that end of the magneto mechanism. The dog 19 is provided with a shoulder 22 which normally rides on the outer circumference of the housing 21 to hold said dog 19 out of engagement with the cams 15. The housing 21 is, however, provided with an inclined surface 23 (see Fig. 5) adjacent the slot 20 against which the shoulder 22 bears as the arm 17 is moved through such slot. When such shoulder rides down the inclination 23, this lowers the dog 19 into the path of the cam 15. This action takes place when the arm 17 is moved to place the magneto in its full retarded position, which is the position assumed when the motor or engine is to be first started. When the dog 19 is not in the path of the cams 15, the tension of the spring 11 is sufficient to permit of the armature being driven without winding up such spring. When, however, the dog 19 is in the path of one of the cams 15 and the sleeve 12 is being driven by the motive power, the tension of the spring 19ª against the dog 19 is sufficient to overcome the tension of the spring 11 so as to cause the dog 19 to form a block against the rotation of the disk 14. Under these conditions then, when the engine is first started, the coiled spring 11 will be wound up and this winding up will continue until the engine or motor reaches what is commonly called "dead center" or the point which just precedes the sparking of the plugs to cause the explosion of the mixture to drive the engine.

A lip 24 on the disk 13 projects into a slot 25 in the end of the sleeve 10. This slot is of sufficient length so that just as the engine reaches the dead center point above mentioned, this lip 24 will engage the end of the slot and revolve the sleeve 10. Therefore, since the disk 14 is connected with the disk 9 on which is the sleeve 10, this will bring the direct force of the driving power, connected with the sleeve 12, against the dog 19 and will push it back against its spring 19ª. This immediately releases the wound spring 10 and acts to immediately and quickly unwind. This quick action of such spring is imparted through the sleeve 10 and disk 9 to the sleeve 8 and armature shaft 6. Thus, the armature is given a sudden acceleration just at the time the engine or motor is about to fire. Hence, the spark delivered to the same is as intense as when the same is running at high speed. This acceleration with its resultant advantages will render it much easier to start the motor than is now the common practice, and this feature is invaluable especially in connection with aeroplane, speed boat and other high power motors which are now usually very hard to start.

After the motor is started and the timing arm 17 is moved back to advanced position, the shoulder 22 rides away from the inclined surface 23 back to the regular circumference of the housing 21. This lifts the dog 19 out of the path of the cams 15 and the regular speed of the armature is then maintained.

The end of the armature opposite the ring 16 is provided with another timing ring 26. (See Fig. 1). The timing mechanism 26ª is preferably connected with this timing ring 26 but may of course be positioned at either end of the armature, as is found most desirable in practice.

Figure 4:
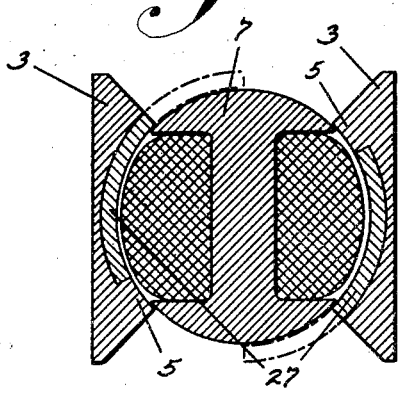
Fig. 4 is a sectional view taken on a line X—X of Fig. 1.

Fixed to the rings 16 and 26 and movable therewith are the secondary pole shoes 27 which are arranged to move in the spaces 4 and abut against the shoulder 5 when the timing rings 16 and 26 are set at full advanced position. These shoes 27 are movable of course with the timing rings 16 and 26 and therefore when such rings are set at such full retarded position, these shoes move out of the spaces 4 and project a distance beyond the shoes 3 and at a spaced distance from the shoulder 5, all as shown by dotted lines in Fig. 4. Since the movement of these secondary pole shoes is identical with the movement of the timing rings, the secondary shoes when so moved at will assume a position relative to the timing cam identical with that of the primary pole shoes when the timing cam is set at full advanced position. This being true, therefore, the armature core in its revolution will break from the secondary pole shoes in identically the same relation with respect to the timing cam that it does from the primary pole shoes when the timing cam is set at its full advanced position. Thus the intensity of the electromotive force generated would, under ordinary circumstances, be the same whether the timing cam was set in full retarded or full advanced position. By my mechanism, however, it is really greater at full retarded position for the reason that the projecting shoulders 5, coupled with the secondary pole shoes 27 being projected in spaced relation from said shoulders 5, act as compounding pole shoes, which, will be readily apparent to those skilled in the art.

The accelerating spring construction and the secondary pole shoes and their relative relation to the primary shoes constitute the main features of my invention. The balance of the construction of the magneto may be of any common or preferred type, hence I do not here enter into a specific description thereof.

The above description embodies, *in toto*, the details of construction of the preferred form of my invention shown in Figs. 1 to 7, inclusive. In Figs. 8 to 11, inclusive, I have shown a modified type embodying the same principles. In this modified type, the numeral 28 designates the body of the frame of the magneto, and 29 designates the armature shaft. The numeral 30 designates the sleeve keyed to the shaft 29, while 31 is the disk on which projects the annular ring 32. The numeral 33 designates the coiled accelerator spring fixed to the ring 32 and to the sleeve 34 on which is the housing disk 35. The numeral 36 designates the cam disk on which are the cams 37. The blocking dog 38 instead of being slidable in the timing arm is slidable in a guide 39 mounted on the housing 40. This dog 38 is normally held out of the path of the cams 37 by means of engagement with one of the timing rings 41. When, however, the timing ring 41 is moved to full retarded position, this brings a recess 42 formed in said ring 41 immediately adjacent the dog 38. The spring 38ª then pushes the dog 38 into this recess. This so lowers the position of the dog 38 as to bring it in the path of one of the cams 37, whereupon the action of the accelerating spring or other parts is the same as in the preferred construction.

In this modified form, the secondary pole shoes 43 are fixed to the timing rings 41 and 44 and move between shoes 45 fixed to the magnets 46. These shoes 45 have projecting shoulders 47 fixed closely adjacent the shoes 43 in order to permit of the passage of the lines of the magnetic force from the shoes 45 to the shoes 43. The shoes 43, however, are the ones mounted in direct relation with the armature and they are movable with the timing rings for the purpose of maintaining the same relative position with respect to the timing arm whether the same is advanced or retarded.

From the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention, what I claim as new and useful and desire to secure by Letters Patent is:—

1. The combination with a magneto having a driving member and a driven armature connected in driving relation with each other to normally rotate at the same speed, of a means, controllable by the movement of the timing mechanism of the magneto, whereby when the time of sparking of the magneto is the most retarded, the armature will be imparted temporarily accelerated speed impulses relative to the driving member, and means, likewise controllable by the timing mechanism, for maintaining a constant relation between the armature and the magnets whereby, during said accelerated speed impulses, the magneto will deliver a spark of the same intensity as when the time of sparking is the most advanced.

2. The combination with a magneto having an armature and an independent driving member, of a disk fixed to the armature shaft, a resilient connection between the driving member and the disk of such tension that the driving member and armature will normally move at the same speed, a means, controllable by the timing mechanism of the magneto, for temporarily arresting the movement of the disk to increase the tension of the resilient member, and means for then releasing the arresting means whereby the increased tension of the resilient member will temporarily accelerate the movement of the disk and armature relative to the driving member.

3. The combination with a magneto having an armature and an independent driving member, of a disk fixed to the armature shaft, a resilient connection between the driving member and the disk of such tension that the driving member and armature will normally move at the same speed, a means, controllable by the timing mechanism of the magneto, for temporarily arresting the movement of the disk to increase the tension of the resilient member, means for then releasing the arresting means whereby the increased tension of the resilient member will temporarily accelerate the movement of the disk and armature relative to the driving member, such latter means including a projection on the disk and a lip on the driving member arranged to engage the projection with each revolution of the driving member and force the disk to move past the arresting means.

4. The combination with a magneto, an impulse starter therefor, and means for placing the impulse starter in operative position when the timing mechanism of the magneto is in its most retarded position and for holding the starter inoperative when such timing mechanism is in its advanced positions.

5. The combination with a magneto, of an impulse starter therefor, means for placing the impulse starter in operative position when the timing mechanism of the magneto is in its most retarded position and for holding the starter inoperative when such timing mechanism is in its advanced positions, and means for generating an intense spark from the magneto when fully retarded and when the impulse starter is functioning.

6. An impulse starter for magnetos comprising a disk fixed to the armature shaft and having projecting cams, a driving member, a resilient connection between the driving member and disk and being of such normal tension as to drive the armature at the same constant speed as that of the driving member, a second disk rotatable relative to the armature shaft and being of a greater diameter than the diameter of the arc of travel of said cams, such second disk having a peripheral notch extending within the diameter of such arc of travel, a dog mounted for radial movement relative to the disks and normally held out of the path of the cams by engagement with the periphery of the second disk, means for moving the second disk to allow the dog to move into said notch and into the path of the cams to arrest the movement of the first disk and increase the tension of the resilient member, and means for then releasing the dog to allow the increased tension of the resilient member to impart an accelerated speed impulse to the armature shaft relative to the speed of the driving member.

7. An impulse starter for magnetos comprising a disk fixed to the armature shaft and having projecting cams, a driving member, a resilient connection between the driving member and disk and being of such normal tension as to drive the armature at the same constant speed as that of the driving member, a second disk rotatable relative to the armature shaft and being of a greater diameter than the diameter of the arc of travel of said cams, such second disk having a peripheral notch extending within the diameter of such arc of travel, a dog mounted for radial movement relative to the disks and normally held out of the path of the cams by engagement with the periphery of the second disk, means for moving the second disk to allow the dog to move into said notch and into the path of the cams to arrest the movement of the first disk and increase the tension of the resilient member, means for then releasing the dog to allow the increased tension of the resilient member to impart an accelerated speed impulse to the armature shaft relative to the speed of the driving member, such latter means including a projection on the first disk, and a lip on the driving member arranged to engage the projection with each revolution of the driving member and push the cam past the dog.

8. An impulse starter for magnetos comprising a disk fixed to the armature shaft and having projecting cams, a driving member, a resilient connection between the driving member and disk and being of such normal tension as to drive the armature at the same constant speed as that of the driving member, a second disk rotatable relative to the armature shaft and being of a greater diameter than the diameter of the arc of travel of said cams, such second disk having a peripheral notch extending within the diameter of such arc of travel, a dog mounted for radial movement relative to the disks and normally held out of the path of the cams by engagement with the periphery of the second disk, means for moving the second disk to allow the dog to move into said notch and into the path of the cams to arrest the movement of the first disk and increase the tension of the resilient member, and means for then releasing the dog to allow the increased tension of the resilient member to impart an accelerated speed impulse to the armature shaft relative to the speed of the driving member, the movement of the second disk being controlled by the movement of the timing mechanism of the magneto.

9. An impulse starter for magnetos comprising a disk fixed to the armature shaft and having projecting cams, a driving member, a resilient connection between the driving member and disk and being of such normal tension as to drive the armature at the same constant speed as that of the driving member, a second disk rotatable relative to the armature shaft and being of a greater diameter than the diameter of the arc of travel of said cams, such second disk having a peripheral notch extending within the diameter of such arm of travel, a dog mounted for radial movement relative to the disks and normally held out of the path of the cams by engagement with the periphery of the second disk, means for moving the second disk to allow the dog to move into said notch and into the path of the cams to arrest the movement of the first disk and increase the tension of the resilient member, means for then releasing the dog to allow the increased tension of the resilient member to impart an accelerated speed impulse to the armature shaft relative to the speed of the driving member, and secondary pole shoes fixed to the second disk and movable therewith whereby the relation of the armature to the magnets will be determined by the movement of said second disk.

10. A magneto including fixed primary pole shoes, secondary pole shoes rotatable adjacent the fixed shoes, a disk fixed to each end of the rotatable pole shoes an impulse starting mechanism for the armature of the magneto, and means, controllable by the movement of the rotatable pole shoes and disks, for placing the starter mechanism into or out of operation.

11. An impulse starter for magnetos comprising a disk fixed to the armature shaft and having projecting cams, a driving member, a resilient connection between the driving member and disk and being of such normal tension as to drive the armature at the same constant speed as that of the driving member, a second disk rotatably mounted relative to the armature shaft, a house inclosing both disks, such housing having a slot and an inwardly inclining surface adjacent one edge of the slot, a lever on the second disk projecting through the slot, a dog mounted in the lever for radial movement relative to the disks, such dog having a projection normally bearing on the casing to hold the dog out of the path of said cams, said lever being movable to ride the projection down such inclined surface to drop the dog into the path of the cams to temporarily arrest the movement of such disk whereby the tension of said resilient member will be increased, and means for then releasing the dog to allow the increased tension of the resilient member to impart an accelerated speed impulse to the armature shaft relative to the speed of the driving member.

In testimony whereof I affix my signature in presence of two witnesses.

JOHN B. BUSHNELL.

Witnesses:
STEPHEN M. BLEWETT,
VERADINE WARNER.